United States Patent [19]

Jaksha

[11] Patent Number: 5,367,933
[45] Date of Patent: Nov. 29, 1994

[54] POWER TOOL SHIELD AND GUIDING APPARATUS

[76] Inventor: Jerome F. Jaksha, 804 Tulip Rd., SE., Rio Rancho, N. Mex. 87124

[21] Appl. No.: 904,462

[22] Filed: Jun. 25, 1992

Related U.S. Application Data

[63] Continuation-in-part of Ser. No. 725,399, Jul. 1, 1991, abandoned, which is a continuation-in-part of Ser. No. 494,753, Mar. 14, 1990, abandoned.

[51] Int. Cl.$^5$ .............................................. B26D 7/06
[52] U.S. Cl. ..................................... 83/440.2; 83/444; 83/446; 83/447; 83/448
[58] Field of Search .............. 83/437, 438, 440.2, 83/446, 447, 448, 449, 450, 467.1, 468.7, 477.2, 444; 144/251 R, 251 B, 242 A, 242 E, 253 F; 269/8

[56] References Cited

U.S. PATENT DOCUMENTS

| | | | |
|---|---|---|---|
| 368,268 | 8/1887 | Adam | 83/446 X |
| 768,663 | 8/1904 | Jackson | 83/440.2 |
| 2,722,247 | 11/1955 | Schroeder et al. | 83/446 |
| 2,801,656 | 8/1957 | Ford | 83/447 X |
| 3,082,799 | 3/1963 | Kennedy | 83/438 |
| 3,101,104 | 8/1963 | Sullivan | 83/440.2 X |
| 3,221,583 | 12/1965 | Nichols et al. | 83/444 X |
| 3,738,403 | 6/1973 | Schwoch et al. | 83/448 X |
| 4,132,256 | 1/1979 | Jones | 83/446 X |
| 4,233,873 | 11/1980 | Jessen | 83/701 X |
| 4,469,318 | 9/1984 | Slavic | 144/253 F X |
| 4,531,438 | 7/1985 | Pair | 83/444 X |
| 4,603,612 | 8/1986 | Atkins | 83/425 |
| 4,628,782 | 12/1986 | Park | 83/442 |

Primary Examiner—Eugenia Jones
Attorney, Agent, or Firm—Dennis F. Armijo; Jeffrey D. Myers; Deborah A. Peacock

[57] ABSTRACT

A power tool guiding and shielding apparatus that is magnetically attached to a work surface. The guide holds a work piece against a guide fence and the work table, allowing the work piece to slide on the work table while being machined. The shield is attached to the guide and the guide fence, which also holds the work piece to the work table.

19 Claims, 4 Drawing Sheets

POWER TOOL SHIELD AND GUIDING APPARATUS

CROSS-REFERENCE TO RELATED APPLICATIONS

This application is a continuation-in-part application of U.S. patent application Ser. No. 07/725,399, entitled *Stationary Guard and Guiding Device*, to Jerome F. Jaksha, filed on Jul. 1, 1991, now abandoned, the teachings of which are incorporated herein by reference. U.S. application Ser. No. 07/725,399 is, in turn, a continuation-in-part application of U.S. application Ser. No. 07/494,753, entitled *Stationary Power Tool Guard and Guiding Device*, to Jerome F. Jaksha, filed Mar. 14, 1990, now abandoned.

BACKGROUND OF THE INVENTION

1. Field of the Invention (Technical Field)

The present invention relates to a power tool shield and guiding apparatus.

2. Background Art

Stationary power tools normally have cutting and shaping blades protruding through a table top. These tools, for example, table saws, shapers, inverted routers, surface planers, and bandsaws, normally cut or shape a work piece or stock which the operator pushes directly at the protruding blade. Normally, a guide fence to one side of the table, and projecting vertically from the table, guides the work piece. In addition to being pushed toward the blade, a work piece must also be pressed downwardly and laterally to maintain engagement with both the table top and the guide fence.

Safety, of course, is the primary concern in the use of such devices. If the work piece binds against the back of the blade, for example, "kickback" may occur, hurling the work piece towards the operator. Also of great concern is the possibility of the operator directly contacting the protruding blade, with possibly disastrous consequences.

Numerous safety devices have been proposed in the prior art. Blade guards shield the operator from the blade; they frequently also are inconveniently located, inhibit visibility, and require accessory equipment to be fully effective. Hold-down devices force the stock snugly against the table, thereby purportedly preventing "kickback." Such devices may also be inconvenient, require accessory devices such as guards, and interfere with the use of push sticks and guards when cutting narrow work pieces. "Tablesaw Safety Devices," by Robinson (*Fine Woodworking*, March/April 1990, pp. 84–88), discusses various prior art guards and hold-down devices.

U.S. Pat. No. 1,712,825, to Klehm, entitled *Saw Guard*, discloses a cantilevered guard shielding a rotary blade. Klehm, however, lacks disclosure regarding hold-down devices and is extremely expensive.

U.S. Pat. No. 2,593,596, to Olson, entitled *Circular Saw Guard*, likewise lacks a hold-down device, as well as lateral pressure against the fence. The guard must be removed during certain sawing operations such as dadoing, shaping, and narrow cuts. Measuring, positioning, and aligning the rip fence are difficult with this guard in position; ripping, particularly angled rip cuts, are also rendered difficult with the guard in position.

U.S. Pat. No. 4,403,534, to Altendorf, et al., entitled *Movable Protective Hood for Power Tool of a Work Tool Machine* discloses a guard with a vacuum hood which also lacks a hold-down device.

U.S. Pat. No. 4,096,789, to Blessinger, entitled *Saw Guard*, likewise lacks hold-down devices, does not prevent "kickback," and provides neither vertical nor lateral pressure on the work piece.

SUMMARY OF THE INVENTION DISCLOSURE OF THE INVENTION)

The present invention relates to a power tool shield and guiding apparatus. The apparatus comprises magnetically holding a housing to a magnetically attractable surface, for example a ferromagnetic power tool worktable; holding a work piece against a guide fence; holding down a work piece against a work table; and shielding the operator from flying debris and "kickback" from the work piece.

In the preferred embodiment, two permanent magnets are embedded in the housing device. Two bendable wings made of polycarbonate material or the like protrude from each side of the housing to force a work piece against a guide fence or work table, depending whether the magnetic housing device is magnetically attached to the work table or the guide fence. An L-shaped member made of polycarbonate material or the like is inserted through a slot in the handle and used to hold down a work piece on the saw table or against a guide fence, again depending where the housing is magnetically attached. The L-shaped hold-down can be adjusted by sliding it through the handle to accommodate different sized work pieces.

In the preferred embodiment, the shield is attached to the housing and a guide fence; the guard is made of a transparent material, for example clear polycarbonate or the like, and contains flaps or wings as hold-downs for the work piece.

Accordingly, it is a primary object of the present invention to provide a saw guard that holds a work piece against a guide fence and to the work table.

Another object of the invention is to provide a power tool guide and guard which additionally provides a hold-down function.

Still another object of the invention is the provision of a saw guard which is quick and easy to use, and safe.

Still another object of the invention is the provision of a saw guard which does not have to be removed during dadoing, ripping, and shaping operations.

Yet another object of the invention is the provision of a guard incorporating a hold-down device to prevent "kickback."

An advantage of the invention is automatic adjustment for work piece thickness.

Another advantage of the invention is the provision of a combination guard and hold-down which attaches to either side of a standard guide fence.

Yet another advantage of the invention is a magnetic housing feature for attaching to a magnetically attractable surface such as a ferromagnetic work table.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

DESCRIPTION OF THE PREFERRED EMBODIMENTS (BEST MODES FOR CARRYING OUT THE INVENTION)

Fundamental to this invention are the problems of an easily adjusting power tool guiding apparatus, how to improve holding a work piece to a guide fence and work table, and shielding a person from debris and "kickback" from the operation of a power tool.

This invention provides for a solution to these problems by a power tool guiding device which comprises a magnetic housing attached to a magnetic work table with bendable holding devices to hold a work piece in both a horizontal and vertical position. Additional hold-down is accomplished by the use of the guide/shield, which also protects the operator.

In the preferred embodiment, different bendable leaf spring devices are used for holding the work piece horizontally and vertically. Adjustment for different work pieces and for compression is easily performed by pressing the housing towards the work piece and sliding the L-shaped member that is inserted through an opening in the handle.

Figure 1:
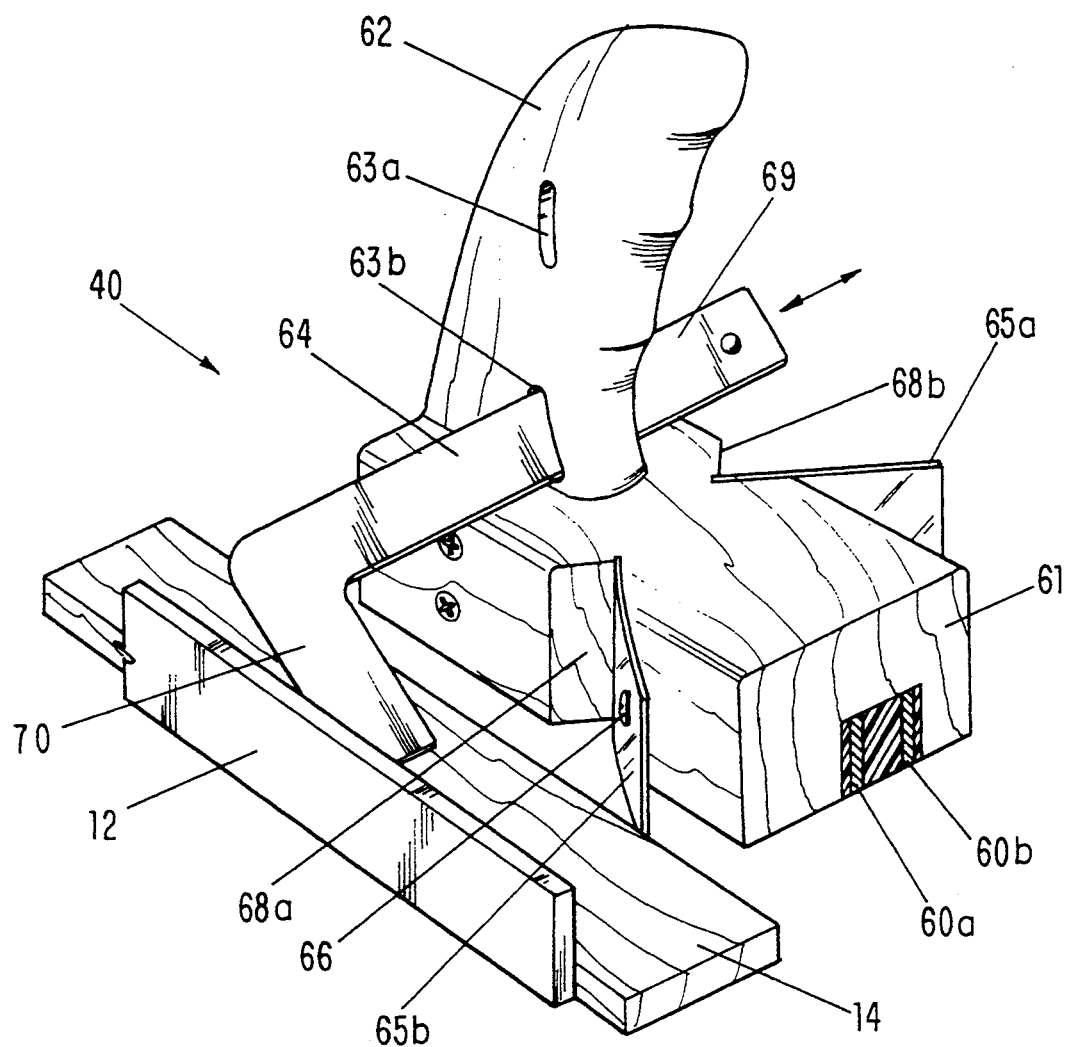
FIG. 1 is a perspective view of the preferred embodiment of the guiding apparatus.
Figure 2:
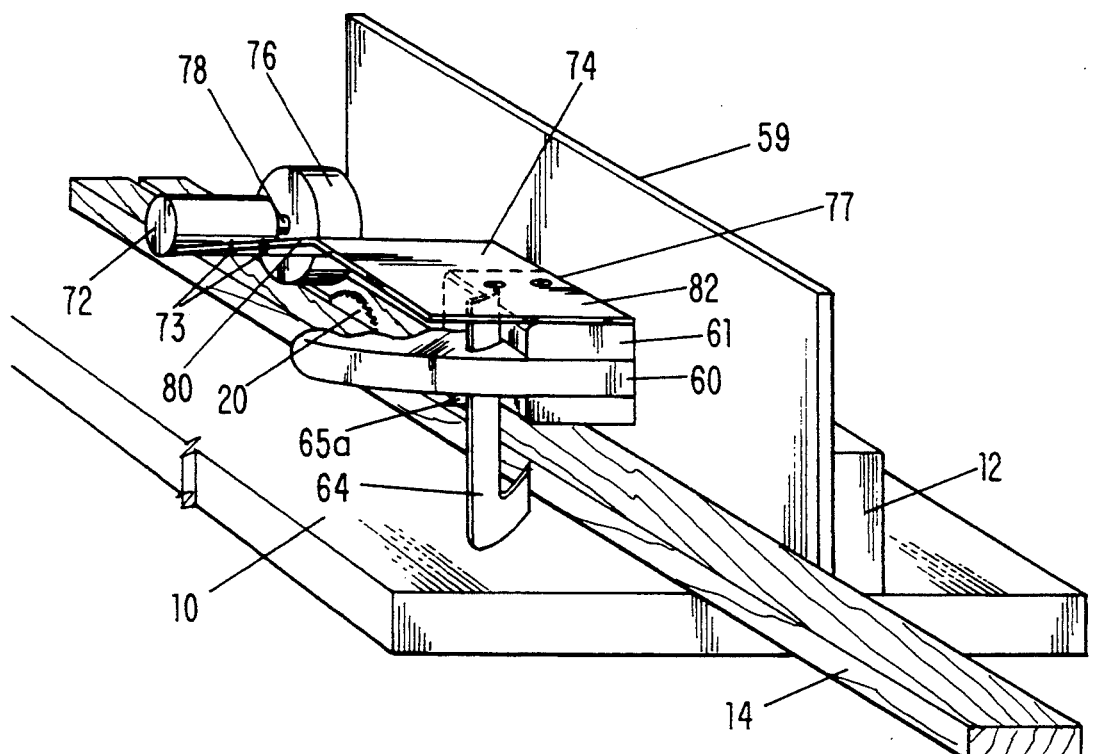
FIG. 2 is an alternative embodiment of the invention with a shield.

Reference is now made to the drawings which illustrate the preferred and alternative embodiments of the invention. FIGS. 1 and 2 illustrate the preferred embodiment of the invention, which depicts a guarding apparatus 40 comprising housing 61. Embedded within housing 61 are permanent magnets 60a and 60b. Handle 62 is attached to one end of housing 61.

Bendable "wings" 65a and 65b are attached by screw 66 at an angle to "V" cutouts 68a and 68b on each side of the housing 61. An L-shaped member 64 having a long end 69 and a short leg 70 is inserted into slot 63b at its long end 69. When inserted, the short leg 70 is at an angle, as shown in FIG. 1 and bendable (for example made of polycarbonate or plastic material or the like). Member 64 can be adjusted to increase the holding compression by sliding long leg 69 into slot 63b. Slot 63a can be used in a similar manner for wider work pieces.

A work piece 14 is placed on a magnetically attractable (for example ferromagnetic) work table 10 against guide fence 12, as shown in FIG. 2. Housing 61 with embedded permanent magnets 60a and 60b is positioned on work table 10, compressing bendable wing 65a against work piece 14. In the configuration of FIG. 1, L-shaped bendable member 64 is adjusted for the desired amount of compression by sliding long leg 69 of L-shaped member 64 in or out of slot 63b in handle 62.

An alternative embodiment for the apparatus is shown in FIG. 2. Motor 72 and wheel 76 are used to compress work piece 14 to work table 10. One end 80 of shield 74, attached by screws 73, preferably of clear polycarbonate material or the like, is attached to motor 72, and other end 82 is attached to a side of housing 61. Magnetic housing apparatus 61 in FIG. 2 is attached to ferromagnetic sheet 59, which is attached to guide fence 12. Bendable wing 65a holds work piece 14 to work table 10, and L-shaped member 64 compresses work piece 14 towards guide fence 12.

Figure 3:
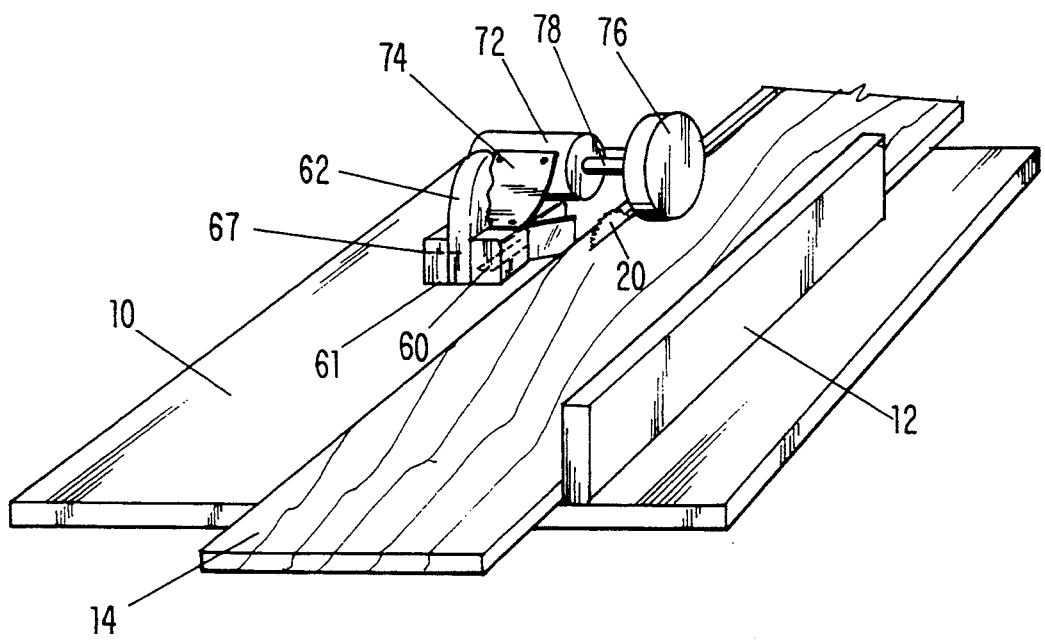
FIG. 3 is yet another alternative embodiment of the guide, shield, and pivoting handle.
Figure 4:
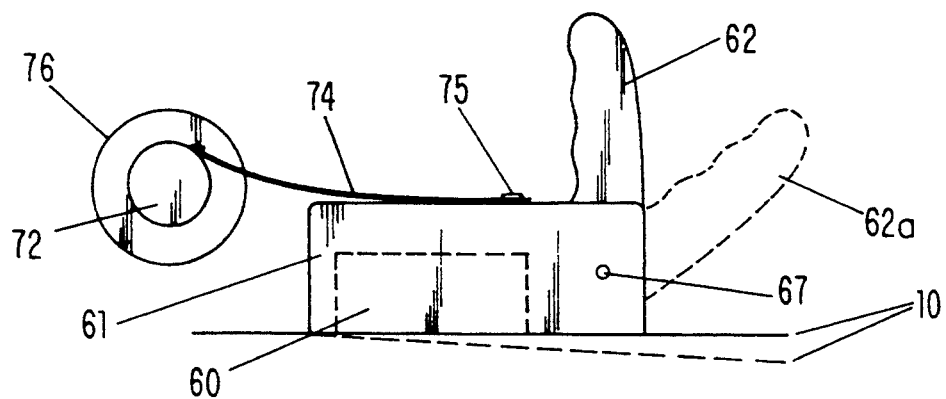
FIG. 4 is a side view of the alternative embodiment of FIG. 3.

Yet another alternative embodiment is shown in FIG. 3. Rotatable wheel 76 is attached to one end of axle 78, and the other end attached to motor 72. Shield 74 is attached as shown to motor 72 and to the top of housing 61. In this embodiment, handle 62 is attached to housing 61 by handle axle 67, allowing handle 62 to pivot backwards, as shown in FIG. 4. When handle 62 is pivoted, magnetic housing 61 is released from the magnetically attractable surface 10.

FIG. 4 also illustrates shield 74 attached by screw 75 to housing 61 and motor 72.

Figure 5:
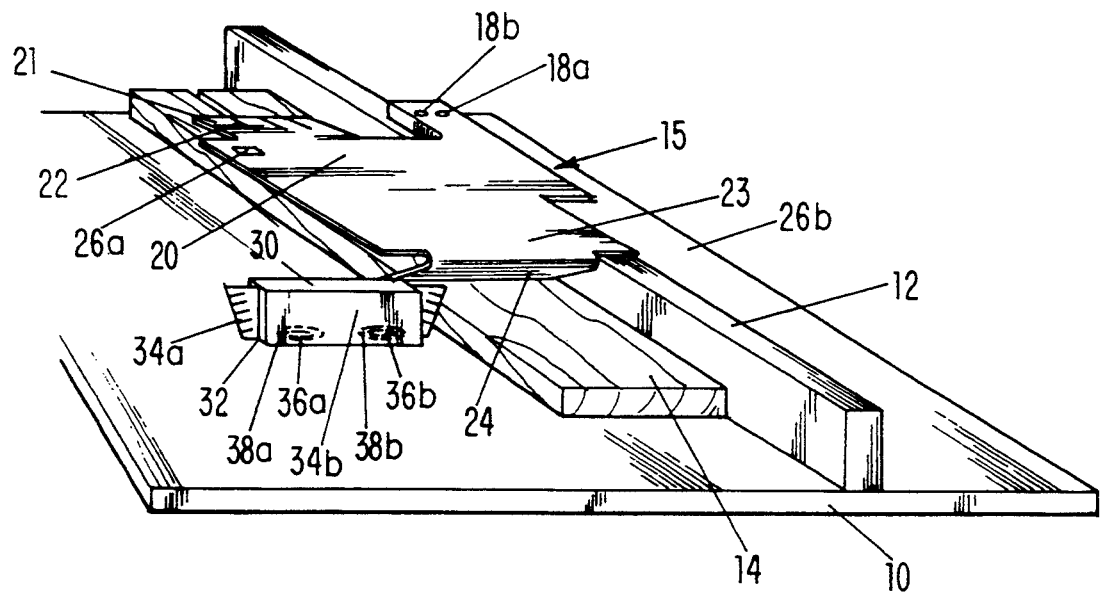
FIG. 5 is a perspective view of yet another alternative embodiment of the guide, shield with hold-downs, and coupling device for the shield.
Figure 11:
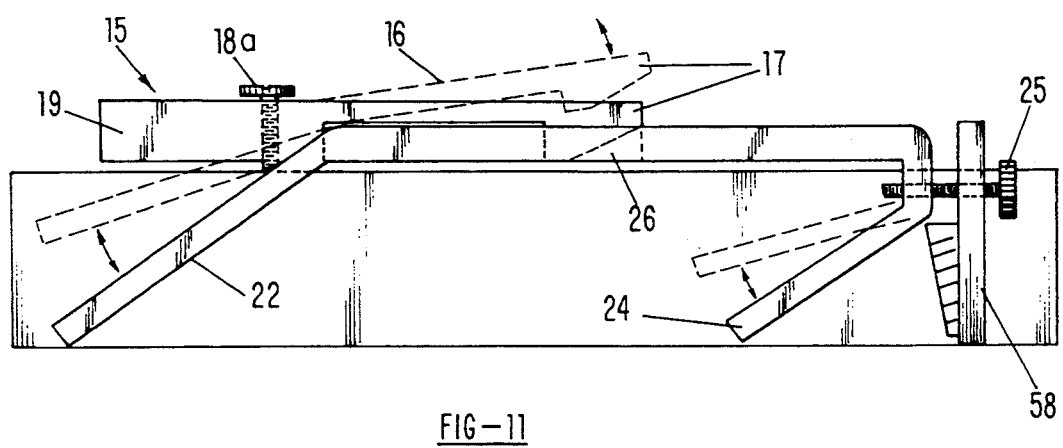
FIG. 11 is a side view of the preferred embodiment of the guide/shield.

FIG. 5 is yet another alternative embodiment of the apparatus. Magnets 38a and 38b are attached to ferromagnetic focusing caps 36a and 36b, which are attached to bottom of housing 30. Leaf spring guide blades 34a and 34b are attached to either side of housing 30. Exposed ends of the leaf spring guide blades 34 are angled as shown. In this embodiment, placement of magnetic housing 30 compresses work piece 14 in a horizontal direction and angled guide blade 34 compresses work piece 14 in a vertical direction, Shield 20 is attached to housing 30 by threaded bolt 18. Other side of shield 20 is attached to guide fence 12 by a coupling device 15. Guide/shield 20 and coupling device 15 are shown in detail in FIG. 11. It illustrates how coupling device 15 is bendable 16 and how protruding end 17 locks into shield attachment hole 26, Bendable hold down flaps 22 and 24 are angled to compress work piece 14, Guide/shield 20 is attached by bolts 18 and 18b to magnetic housing 30.

Figure 6:
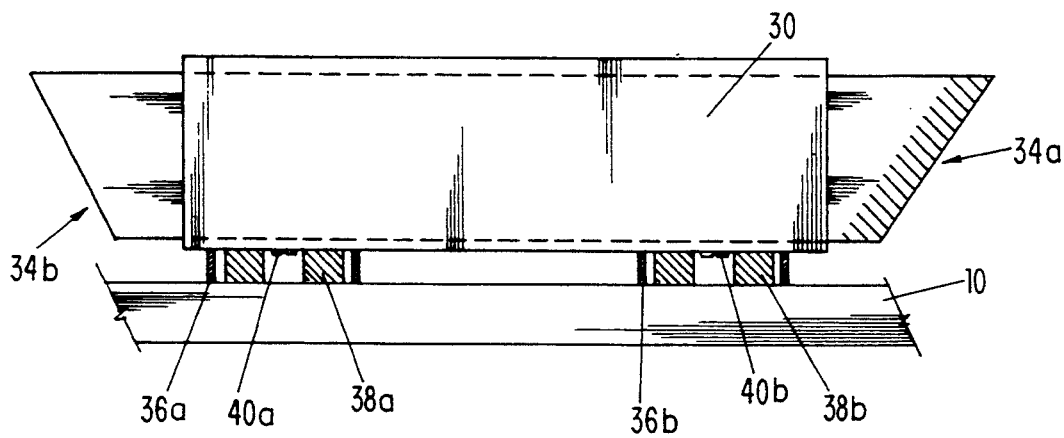
FIG. 6 is a front view of the guide in the alternative embodiment of FIG. 5.

FIG. 6 is a front view of the magnetic guide of FIG. 5 illustrating housing 30 with leaf spring guide blades 34a and 34b. Magnets 38a and 38b are attached to housing 30 by screws 40a and 40b. Focusing caps 36a and 36b are attached to magnets 38a and 38b and are magnetically attached to work table 10.

Figures 7, 8:
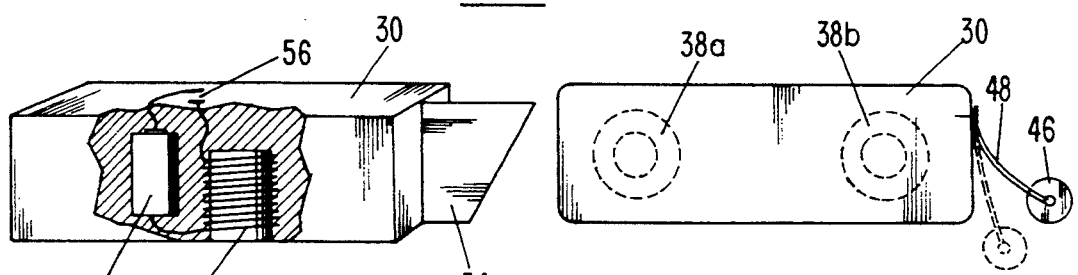
FIG. 7 is a front view of the alternative embodiment of the invention of FIG. 5 with an electromagnet.
FIG. 8 is a top view of the alternative embodiment of the invention of FIG. 5 with a guide wheel with a leaf spring axle.

Other alternative variations of the invention of FIG. 6 are shown in FIG. 7 wherein electromagnet 52, battery 54, and switch 56 are disposed within housing 30.

FIG. 8 is a top view of an alternative embodiment of the invention of FIG. 6 with housing 30, attached leaf spring axle 48, and mounted wheel 46.

Figures 9, 10:
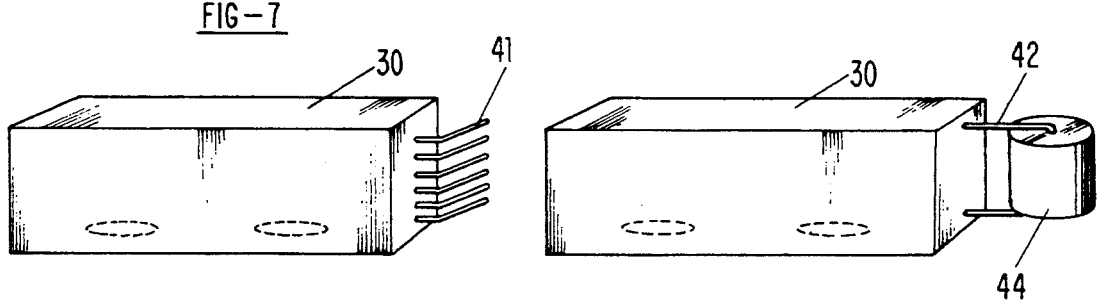
FIG. 9 is a front view of an alternative embodiment of the invention of FIG. 5 with springable bristles.
FIG. 10 is a front view of the alternative embodiment of the invention of FIG. 5 with a compressible guide wheel.

FIG. 9 depicts another alternative embodiment of the apparatus using bristles 41 as a hold-down device.

FIG. 10 shows yet another alternative embodiment of the invention which has fixed axle 42 with compressible guide wheel 44 mounted for compression hold-down.

Although the invention has been described with reference to these preferred embodiments, other embodiments can achieve the same results. Variations and modifications of the present invention will be obvious to those skilled in the art and it is intended to cover in the appended claims all such modifications and equivalents. The entire disclosures of all applications, patents, and publications cited above, and of the corresponding application are hereby incorporated by reference.

What is claimed is:

1. A power tool shield guiding apparatus for use with a magnetically attractable surface, the apparatus comprising:

housing means;

a handle attached to said housing means having an opening extending therethrough;

magnetic holding means attached to said housing means for securing said housing means to a magnetically attractable surface;

a first compressing engagement means on said housing means for exerting a first compressing force and for guiding a work piece against a first work supporting member; and a second compressing engagement means on said housing means for exerting a second compressing force and for guiding the workpiece against a second work supporting member, the second compressing engagement means comprising a slidably insertable means received in the opening in the handle for adjusting the second compressing force, wherein said first compressing engagement means exerts said first compressing force substantially perpendicular to the second compressing force of said second compressing engagement means wherein the first compressing force is adjustable and the second compressing force is adjustable independently of the first compressing force.

2. The guiding apparatus of claim 1 wherein said housing means is made of a non-magnetic material.

3. The guiding apparatus of claim 1 wherein said magnetic holding means comprises at least one permanent magnet.

4. The guiding apparatus of claim 1 wherein said magnetic holding means comprises magnetic circuit means.

5. The guiding apparatus of claim 4 wherein said magnetic circuit means comprises electromagnet means, voltage source means, and switching means.

6. The guiding apparatus of claim 1 wherein said magnetic holding means is attached to said housing means by embedding it in said housing means.

7. The guiding apparatus of claim 1 wherein at least one of said compressing engagement means comprises leaf spring means.

8. The guiding apparatus of claim 7 wherein said leaf spring means comprises an angled end.

9. The guiding apparatus of claim 7 wherein said leaf spring means comprises bendable material.

10. The guiding apparatus of claim 1 wherein at least one of said compressing engagement means comprise a plurality of flexible strips.

11. The guiding apparatus of claim 1 wherein said first compressing engagement means comprises a rotating wheel means.

12. The guiding apparatus of claim 11 wherein said rotating wheel means is attached to compression spring means.

13. The guiding apparatus of claim 11 wherein said rotating wheel means is made of compressibly deformable material.

14. The guiding apparatus of claim 1 wherein said handle is pivotally attached to said housing means for removably securing said housing means to the magnetically attractable surface.

15. The guiding apparatus of claim 1 wherein said first compressing engagement means is attached to a side of said housing means.

16. The guiding apparatus of claim 1 wherein said first compressing engagement means comprises bendable wings protruding from either side of said housing means.

17. The guiding apparatus of claim 1 wherein said slidably insertable means comprises an L-shaped bendable member insertable through the opening in said handle.

18. The guiding apparatus of claim 1 wherein said apparatus further comprises guide shield means.

19. The guiding apparatus of claim 18 wherein said guide shield means further comprises a third compressing engagement means for guiding the work piece against the second work supporting member.

* * * * *